US 12,024,094 B2

(12) United States Patent
Henry, Jr. et al.

(10) Patent No.: US 12,024,094 B2
(45) Date of Patent: Jul. 2, 2024

(54) TOOL MOUNTING DEVICE

(71) Applicant: Adrian Steel Company, Adrian, MI (US)

(72) Inventors: Mark Anthoney Henry, Jr., Adrian, MI (US); Joshua Merle Rogers, Manitou Beach, MI (US); Joshua Michael Gerez, Tecumseh, MI (US)

(73) Assignee: Adrian Steel Company, Adrian, MI (US)

( * ) Notice: Subject to any disclaimer, the term of this patent is extended or adjusted under 35 U.S.C. 154(b) by 191 days.

(21) Appl. No.: 17/652,106

(22) Filed: Feb. 23, 2022

(65) Prior Publication Data

US 2022/0388452 A1    Dec. 8, 2022

Related U.S. Application Data

(60) Provisional application No. 63/208,164, filed on Jun. 8, 2021.

(51) Int. Cl.
*A47F 5/00*    (2006.01)
*B60R 11/06*    (2006.01)
*F16M 11/10*    (2006.01)
*B60R 11/00*    (2006.01)

(52) U.S. Cl.
CPC ............ *B60R 11/06* (2013.01); *F16M 11/10* (2013.01); *B60R 2011/0064* (2013.01); *B60R 2011/0082* (2013.01)

(58) Field of Classification Search
CPC ............ B60R 11/06; B60R 2011/0064; B60R 2011/0082; F16M 11/10; B60P 3/14
See application file for complete search history.

(56) References Cited

U.S. PATENT DOCUMENTS

| | | | |
|---|---|---|---|
| 3,443,730 A | | 5/1969 | Meusel |
| 4,015,725 A | * | 4/1977 | Ryan ..................... A61G 3/06 |
| | | | 414/539 |
| 4,413,761 A | * | 11/1983 | Angel ..................... B60R 9/06 |
| | | | 293/117 |
| 4,476,959 A | * | 10/1984 | Tortellier ............ B60P 1/4442 |
| | | | 414/921 |
| 4,705,254 A | | 11/1987 | Swanson |

(Continued)

FOREIGN PATENT DOCUMENTS

| | | |
|---|---|---|
| DE | 10004957 A1 | 8/2001 |
| EP | 1095819 A1 | 5/2001 |
| FR | 2676677 A1 | 11/1992 |

OTHER PUBLICATIONS

Canadian Intellectual Property Office, Examiner's Report in Application No. CA3152717, dated Jun. 19, 2023, 4 pages.

*Primary Examiner* — Amy J. Sterling
(74) *Attorney, Agent, or Firm* — Marshall & Melhorn, LLC

(57) ABSTRACT

A tool mounting device may have a base having a first base flange and a second base flange extending therefrom. A tool support may be connected to the first and second base flanges where the tool support may be adapted for selective pivotal motion with respect to the first and second base flanges. The tool support may have a first arm and a second arm and the arms may be connected by an arm base. The arms may also be adapted to support a tool thereon. A biasing member may be connected between one of the base flanges and the tool support.

24 Claims, 5 Drawing Sheets

(56) References Cited

U.S. PATENT DOCUMENTS

| | | | |
|---|---|---|---|
| 4,949,945 A * | 8/1990 | Whiteley | B25B 1/2484 |
| | | | 269/95 |
| 5,029,717 A | 7/1991 | Chambers et al. | |
| 5,082,037 A | 1/1992 | Hammons et al. | |
| 5,267,748 A * | 12/1993 | Curran | B60R 9/06 |
| | | | 280/415.1 |
| 5,433,356 A * | 7/1995 | Russell | B25B 1/2484 |
| | | | 224/523 |
| 5,678,743 A * | 10/1997 | Johnson | B60P 3/40 |
| | | | 224/523 |
| 5,890,739 A | 4/1999 | Cogswell, Sr. | |
| 5,975,472 A | 11/1999 | Hung | |
| 6,394,403 B1 | 5/2002 | Hung | |
| 6,450,467 B2 * | 9/2002 | Timm | A47B 21/0314 |
| | | | 312/28 |
| 6,695,274 B1 | 2/2004 | Chiu | |
| 7,080,823 B1 | 7/2006 | Triplett | |
| 7,523,905 B2 * | 4/2009 | Timm | A47B 21/0314 |
| | | | 108/138 |
| 7,887,014 B2 | 2/2011 | Lindblad et al. | |
| 8,011,632 B2 | 9/2011 | Wang et al. | |
| 3,262,047 A1 | 9/2012 | Lindblad et al. | |
| 8,261,954 B2 | 9/2012 | Lee | |
| 8,439,239 B2 | 5/2013 | Lee | |
| 8,480,149 B2 * | 7/2013 | Durand | B60R 9/06 |
| | | | 296/26.1 |
| 8,556,143 B2 | 10/2013 | Gold et al. | |
| 8,602,277 B2 | 12/2013 | Lee | |
| 8,613,379 B2 | 12/2013 | Lee | |
| 8,783,639 B2 | 7/2014 | Lindblad et al. | |
| 9,320,352 B2 * | 4/2016 | Blackburn | A47B 21/0314 |
| 9,334,689 B2 | 5/2016 | Sautter, Jr. | |
| 9,624,029 B2 * | 4/2017 | Nehring | B60D 1/06 |
| 9,663,039 B2 * | 5/2017 | Marmon | B60D 1/58 |
| 9,943,454 B2 | 4/2018 | Saucier et al. | |
| 10,005,332 B2 | 6/2018 | Nehring | |
| 10,300,751 B2 | 5/2019 | Nehring | |
| 10,898,396 B2 | 1/2021 | Celis et al. | |
| 2002/0172581 A1 | 11/2002 | Maney | |
| 2003/0075653 A1 | 4/2003 | Li | |
| 2007/0237572 A1 * | 10/2007 | Thiessen | F16M 11/2014 |
| | | | 403/96 |
| 2008/0179478 A1 | 7/2008 | Lee | |
| 2018/0363376 A1 * | 12/2018 | Jones | B60R 11/06 |

* cited by examiner

TOOL MOUNTING DEVICE

FIELD

One embodiment of a tool mounting device is disclosed and depicted. The device may be adapted to mount to a vehicle and support a tool thereon.

BACKGROUND

Utility and working vehicles are known for accommodating tools and equipment needed for various tasks. For example, a trades-person may have a vehicle outfitted with tools and equipment for the various tasks likely to be encountered on a job.

Some trades-people would find it helpful if their vehicle was equipped with a vice. Generally, a vice is a mechanical apparatus with two parallel jaws. A first jaw may be fixed, while a second jaw may be movable with respect to the first jaw so that work objects can be selectively secured therein.

Vices, however, are often large, heavy objects that need a secure mounting, which may not be readily available on most vehicles. Further, it is often desirable to have a large area around a vice to not only accommodate work objects but also so that the trades-person can move about the vice and the work object as needed. At least these limitations have resulted in vices disadvantageously not being located on vehicles at all, or put in less than optimal locations.

In some past instances other has attempted to mount tools, such as vices, on structures that connect with the trailer hitch of a vehicle. It has been found, however, that the single point of attachment at the trailer hitch does not provide a stable mount. This is often because the structures must cantilever the tool mount far from the hitch, which results in lateral, as well as vertical, instability. In other words, the hitch mount is not secure or stable enough to keep the mounted tool from moving. Further, a hitch mounted tool must either be removed from the hitch for storage or kept in place, which exposes the tool to the environment and may impermissibly extend off the vehicle. Neither are good solutions.

In view of the disadvantages associated with the prior art, it would be advantageous to provide a mounting device for a tool, such as a vice, that robustly secured the tool to the vehicle, that also provided adequate workspace for the work objects and around the tool, and that also has a compact footprint.

SUMMARY

In one aspect, a tool mounting device may have a base with a first base flange and a second base flange extending therefrom. The device may also have a tool support connected to the first and second base flanges. The tool support may be adapted for selective pivotal motion with respect to the first and second base flanges. The tool support may have a first arm and a second arm and the arms may be connected by an arm base. The first and second arms may each have lip portions adapted to support a tool thereon. A biasing member may be connected between one of the base flanges and the tool support.

In another aspect, the base may have a planar upper surface and a planar lower surface. The first and second base flanges may extend substantially parallel one another and substantially transversely from the upper surface.

In another aspect, the first and second base flanges may be separated from one another by a gap, and the first and second base flanges may be substantially the same shape as one another.

In another aspect, a portion of the tool support may be located within the gap and may be adapted for selective pivotal movement within the gap with respect to the first and second base flanges.

In another aspect, the first and the second base flanges may have aligned apertures and the tool support may have at least one set of apertures aligned with the aligned apertures in the first and second base flanges.

In another aspect, the first and second arms may extend substantially parallel one another and the arm base may extend between the first and second arms in a substantially transverse fashion.

In another aspect, the arm base may have a width that is approximately the same as a distance between the first and second arms.

In another aspect, the first and second arms may each have lip portions that are cantilevered away from the arm base.

In another aspect, the biasing member has a first end connected by a ball joint to one of said lip portions and a second end connected by a ball joint to one of said base flanges.

In another aspect, a tool support stop may extend through aligned apertures in the first and second base flanges.

In another aspect, a tool support pivot may extends through aligned apertures in the first and second base flanges and aligned apertures in the first and second arms.

In another aspect, a spring biased tool support pin may selectively extend through aligned apertures between one of the base flanges and one of the arms of the tool support.

In another aspect, the lip portions and the arm base may be substantially parallel an upper surface of the base.

In another aspect, a body portion of the tool support may be substantially parallel the first and second base flanges.

In another aspect, the lip portions and the arm base may be generally transverse an upper surface of the base.

In another aspect a body portion of the tool support may be substantially parallel the first and second base flanges.

In another aspect, a tool mounting device may have a base having a planar upper surface from which two parallel base flanges extend transversely therefrom. The device may also have a tool support connected to the first and second base flanges. The device may also have a tool support pivot extending through aligned apertures in both the tool support and first and second base flanges. The device may also have a tool support pin extending through aligned apertures in the tool support and one of the first or the second base flanges.

In another aspect, a portion of the tool support may be located between the first and second base flanges.

In another aspect, the tool support pivot may be coplanar with the tool support pin but the tool support pin may be located closer to the lip portions of the tool support compared with the tool support pin.

In another aspect, lip portions on the tool support may extend parallel but not coplanar with the base.

BRIEF DESCRIPTION OF THE DRAWINGS

The above, as well as other advantages of the present device, will become readily apparent to those skilled in the art from the following detailed description when considered in the light of the accompanying drawings in which.

DETAILED DESCRIPTION OF THE PREFERRED EMBODIMENTS

Figure 1:
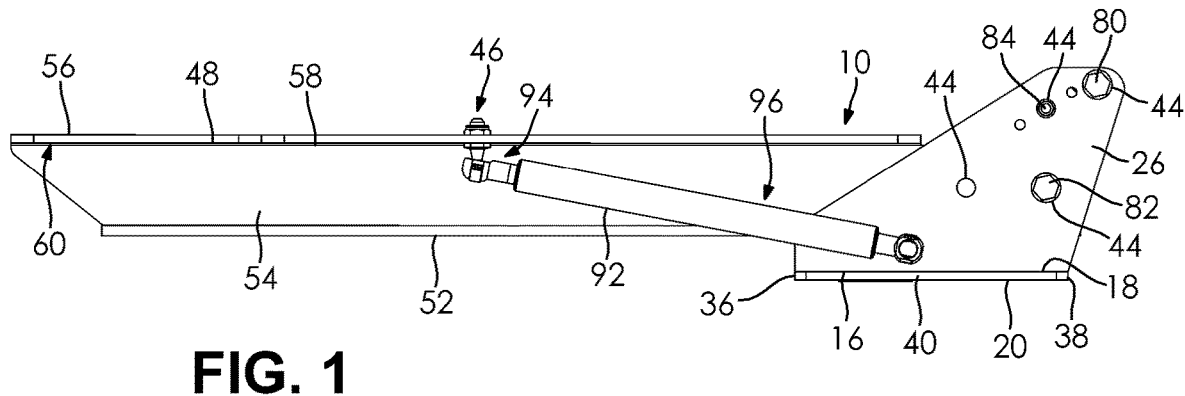
FIG. 1 is a side view of one embodiment of a mounting device in a lowered position.

It is to be understood that the device may assume various alternative orientations and step sequences, except where expressly specified to the contrary. It is also to be understood that the specific devices and processes illustrated in the attached drawings, and described in the following specification are simply exemplary embodiments. Hence, specific dimensions, directions or other physical characteristics relating to the embodiments disclosed are not to be considered as limiting, unless expressly stated otherwise.

Turning now to the figures, one embodiment of tool mounting device 10 is depicted. The tool mounting device 10 may be adapted for being located in or on a vehicle 12, such as a cargo area 14, a bumper, floor, wall, work area, or any area, of the vehicle 12. The tool mounting device 10 may also work equally well mounted on a structure within the vehicle 12 such as a workbench, a shelf, a partition or the like.

The vehicle 12 may be such as a cargo van or pickup truck, but other vehicles may be used. Further, the device 10 may be used in non-mobile locations as well, such as workshops.

Regardless of its location, the device 10 may have a base 16. In the depicted exemplary embodiment, the base 16 may be such as a plate or plate-like structure. The base 16 may have any size, shape or thickness, but in the present embodiment, the base 16 may be square or rectangular. The base 16 may have an upper surface 18 and a lower surface 20. The surfaces 18, 20 may be substantially planar to define a constant thickness between them.

The base 16 may have at least one fastener aperture 22 extending from the upper surface 18 to the lower surface 20. In some embodiments, there may be a plurality of fastener apertures 22 in the base. The fasteners apertures 22 may be located such as at corner portions 24 of the base 16. Mechanical fasteners (not shown) may be located through the apertures 22 and into a substrate to fix the base 16, and the device 10, thereto.

At least one base flange may extend from the base 16. In some embodiments, a first base flange 26 and second base flange 28 may extend from the base 16. The base flanges 26, 28 may extend at an angle to the base 16. In some embodiments, base flanges 26, 28 may extend transversely, or substantially transversely, to the base 16.

The base flanges 26, 28 may be integrally formed, unitary and one-piece with the base 16, or they may be separate components that are separately attached to the base 16. In the latter situation, the base flanges 26, 28 may be attached such as through mechanical fasteners and/or welding.

Each of the base flanges 26, 28 may be constructed as a plate or as a plate-like structure. In a plate configuration, each base flange 26, 28 may have an inboard surface 30A, B that faces the other and an outboard surface 32A, B that faces away from one another opposite the inboard surfaces 30A, B.

In some embodiments, the base flanges 26, 28 may be a polygon, such as a quadrilateral. The edges that define the base flanges 26, 28 and their shape may include transitions. The transitions may include radiused portions between edges. The radiused portions may help reduce or eliminate sharp portions between the edges.

The base flanges 26, 28 may share the same size and shape, or they may differ from one another. The base flanges 26, 28 may extend parallel one another, but be separated from one another on the base 16. A fixed distance gap 34 may separate the two base flanges 26, 28. In some embodiments, the base flanges 26, 28 may extend continuously and without interruption from a front edge 36 of the base 16 to a rear edge 38 of the base 16. The base flanges 26, 28 may be set at equal distances from first 40 and second 42 sides of the base 16.

Each base flange 26, 28 may have a plurality of apertures 44 extending therethrough. The apertures 44 may be spaced from one another across each base flange 26, 28. There may be an equal or unequal number of apertures 44 in each base flange 26, 28 between the respective base flanges 26, 28. In some embodiments, at least some apertures 44 in the first base flange 26 may be aligned with the apertures 44 in the second base flange 28.

A tool support 46 may be connected to at least one of the base flanges 26, 28. One embodiment of a tool support connection, as well as features, is depicted in the figures. The tool support 46 may be movably connected to at least one of the base flanges 26, 28. In some embodiments, the tool support 46 may be pivotally connected to at least one of the base flanges 26, 28.

The tool support 46 may be comprised of a first arm 48 and a second arm 50. The arms 48, 50 may be unitary, one piece and integrally formed individually and/or with one another, or they may be individual pieces that are connected together. In one embodiment, the arms 48, 50 may be connected together by an arm base 52.

Each arm 48, 50 may have a body portion 54 and a lip portion 56. The lip portions 56 may extend at an angle from the body portions 54. The angle may be such as transverse. In some embodiments, the lip portions 56 may be cantilevered in an outboard direction with respect to the body portions 54. It may be that the lip portions 56 only extend in the outboard direction and that the lip portions 56 do not extend in the inboard direction. The lip portions 56 may extend from top edges 58 of the body portion 54.

The lip portions 56 may have a constant size and shape substantially along the length of the body portions 54, or the size and shape of the lip portions 56 may vary. In some embodiments, the width of the lip portions 56 may be substantially constant along the body portions 54 but they may then increase in width near front end 60 portions of the body portions 54. The increase in width may be such as double with original width of the lip portions 56. An increase in width may assist in supporting a tool 62, such as a vice, thereon.

The lip portions 56 may terminate before they reach rear edges 64 of the body portions 54 of the arms 48, 50. In these cases, the body portions 54 continue without lip portions 56 to the rear edges 64.

The lip portions 56 may have upper and lower surfaces 66, 68. The surfaces 66,68 may define a constant thickness of the lip portions 56 along their length of the body portions 54.

In some embodiments, apertures 70 may be provided in the lip portions 56. Some apertures 70 may be provide in the increased width portions of the lip portions 56 to receive fasteners to fix one or more devices or objects, including tools 62 and/or a vice thereto.

The first and second arms 48, 50 may extend parallel one another but separated by a gap 72. The gap 72 may be provided by the arm base 52. The arm base 52 may extend substantially continuously from the front end portion 60 to the rear edge 64. A non-continuous arm base 52, or one that has one or more gaps between arm segments may also be used. The arm base 52 may have a constant width resulting in the arms 48, 50 extending a constant distance from one another. The thickness of the arm base 52 may also be constant.

It may be that the first and second arms 48, 50 are mirror images of one another, or substantially mirror images of one another. In cases of symmetry, or substantial symmetry, a line of symmetry 74 may extend between the arms 48, 50.

A rear portion 76 of each arm 48, 50 may have a plurality of apertures 78 formed therein. The apertures 78 are adapted to align with the apertures 44 in the first and second base flanges 26, 28. Further, the rear portion 76 of each arm 48, 50 is adapted to fit between the first and second base flanges 26, 28. In some embodiments, the inboard surfaces 30A, B of the base flanges 26, 28 may be located directly adjacent the outboard surfaces 32A, B of the rear portions 76 of the first and second arms 48, 50. In these embodiments, the inboard surfaces 30A, B may be dimensioned such that relative movement between the inboard surfaces 30A, B and the outboard surfaces 32A, B is permissible.

The base 16, the base flanges 26, 28 and the tool support 46 may be constructed of a robust material capable of being constantly exposed to harsh use and an outdoor environment. In some embodiments, each may be constructed of the same material, such as metal, including but not limited to steel. In other embodiments, the device 10 components may be constructed of different materials from one another; other metals, composites, polymers and/or plastics may be used.

In a lowered position of the tool support 46, the arm base 52 may be generally parallel the upper surface 18 of the base 16. Further, the lip portion 56 may also be at least generally parallel the upper surface 18 of the base 16.

Figure 3:
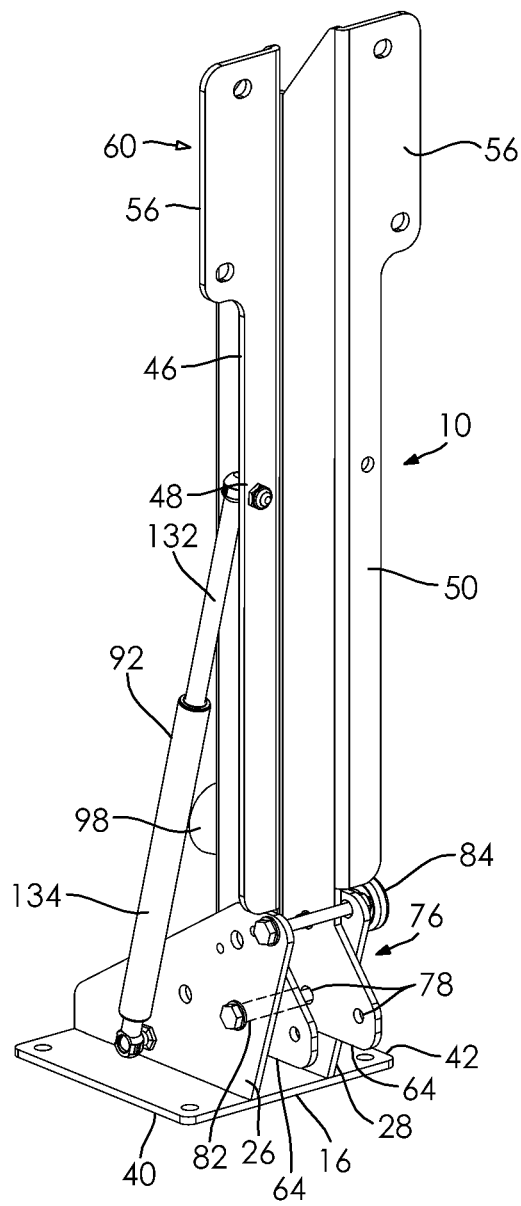
FIG. 3 is a side perspective view of the mounting device in FIG. 1 in a raised position.
Figure 4:
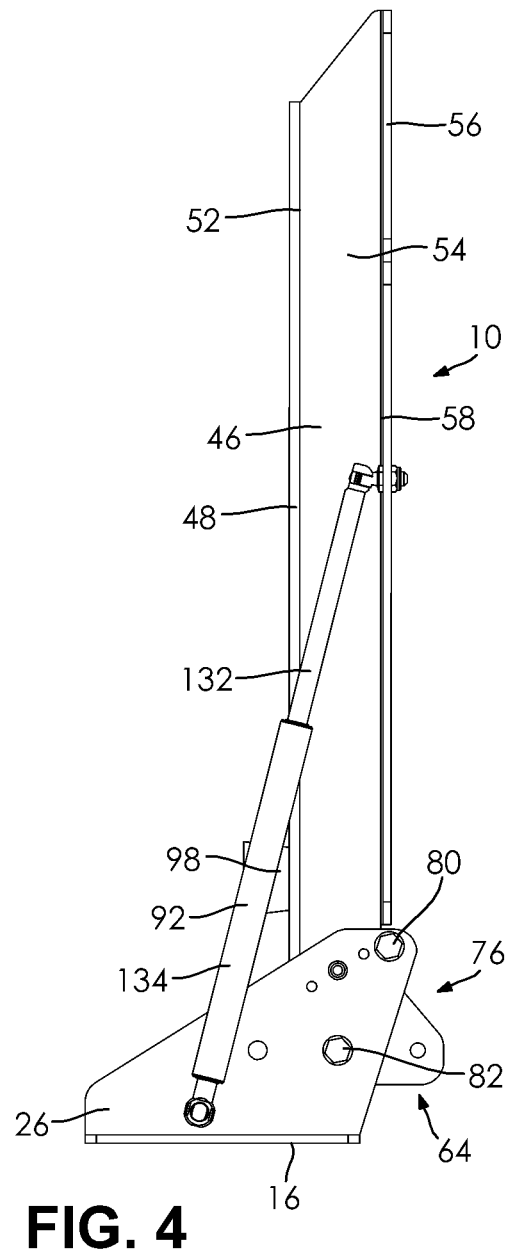
FIG. 4 is a side view of the mounting device in FIG. 1.

A tool support stop 80 may be located through aligned apertures 44 in the first and second base flanges 26, 28. In one embodiment, the stop 80 may be located through the upper most aligned apertures 44 in the base flanges 26, 28. The stop 80 may be such as a tube or rod-like fastener but other structures may be used. In one embodiment, a bolt with a head on one end prevents the bolt from escaping the aperture 44. Threads on the opposite end of the bolt receive a nut that keeps the bolt from escaping its adjacent aperture 44. The body of the bolt may be extended parallel the upper surface 18 of the base 16. The stop 80 prevents the rear edges 64 of the tool support 46 from moving past it when the tool support 46 is in a raised position, as shown in FIGS. 3 and 4.

A tool support pivot 82 may be located through aligned apertures 44 in the first and second base flanges 26, 28, as well as in aligned apertures 78 in the first and second arms 48, 50 that are aligned with the flange apertures 44.

The pivot 82 may be such as a tube or rod-like fastener but other structures may be used. In one embodiment, a bolt with a head on one end prevents the bolt from escaping the apertures 44, 78. Threads on the opposite end of the bolt receive a nut that keeps the bolt from escaping its adjacent aperture 44, 78. The body of the bolt may be extended parallel the upper surface 18 of the base 16. The pivot 82 creates and facilitates respective pivotal motion between the tool support 46 and the arms 48, 50.

Figure 2:
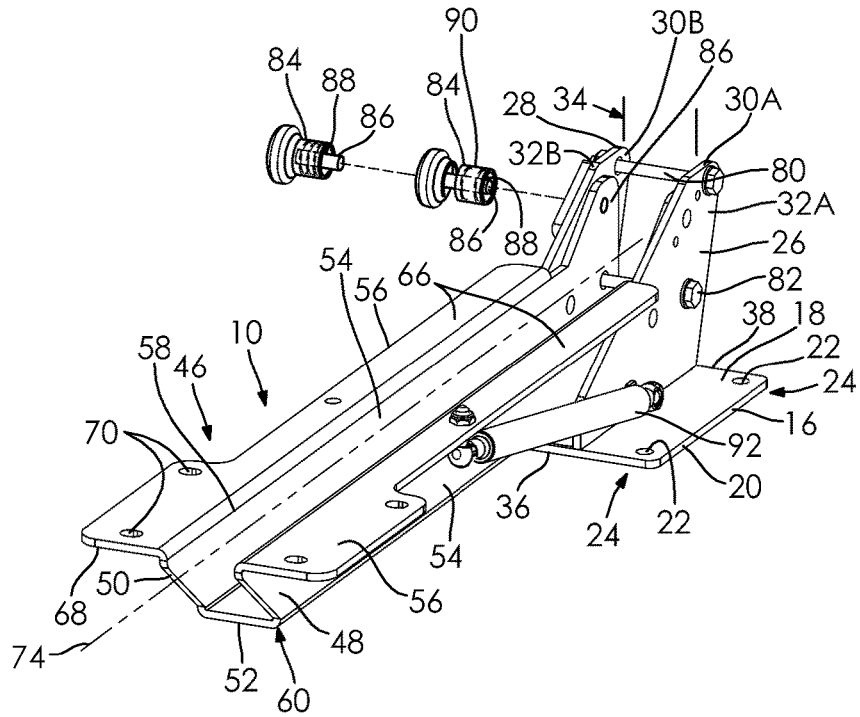
FIG. 2 is an upper perspective view of the mounting device in FIG. 1.

A tool support pin 84 may be located through aligned apertures 44, 78 in at least one of the first or second base flanges 26, 28, as well as in at least one of the first or second arms 48, 50. By way of example only, the FIGS. 1 and 2 depict the tool support pin 84 in a first aperture 44 in the first base flange 26 and a first aperture 78 in the first arm 48 where the apertures 44, 78 are aligned. In this embodiment, the tool support 84 is in the lowered position. FIGS. 3 and 4 depict the tool support pin 84 in the first aperture 44 in the first base flange 26 and a second aperture 78 in the first arm base where the apertures 44, 78 are aligned. In this embodiment, the tool support 46 is in the raised position.

In one embodiment, the tool support pin 84 may be a selectively biased, such as through a biasing structure. The biasing structure may be such as a spring 90 located within or about a housing for the pin 84.

In some embodiments, the pin 84 may be comprise a biased portion 86 connected to a housing 88. The housing 88 may at least partially locate a spring 90 therein where the spring 90 is connected to the biased portion 86. The biased portion 86 may be such as a rod or tube where the biased portion 86 is selectively biased into one or more of the apertures 44, 78 to secure the first base flange 26 and the first arm 48 in one of the positions noted above.

FIG. 2 depicts two conditions of the same tool support pin 84. In the left hand condition, the biased portion 86 is in the extended condition. Such a condition might be when the pin 84 is to lock the base flange 26 to the first arm 48. In the right hand condition, the biased portion 86 is in the retracted condition. Such a condition might be used when the pin 84 is to be withdrawn from the base flange 26 and/or the first arm 48 so that the two can move with respect to one another.

In other embodiments, the tool support pin 84 may be such as a tube or rod-like fastener. A head portion on the pin 84 may prevent the pin 84 from being removed from the apertures 44, 78.

In some embodiments, at least one biasing member 92 may be connected between the tool support 46 and the base 16 and/or one or more of the base flanges 26, 28. The biasing member 92 may assist in slowing the tool support 46 as it is moved from the raised to the lowered position. The biasing member 92 may be such as a pneumatic or hydraulic piston, but other pistons, springs of various types and/or other biasing members may be used. In the depicted embodiment, a first end portion 94 one end of the biasing member 92 may be connected to the tool support 46, such as the body portion 54, and a second end portion 96 of the biasing member 92 may be connected to one of the base flanges 26, 28, or the base 16. The connections between the biasing member 92 and the tool support 46 and the base flanges 26, 28 or base 16 may be such as through devices that accommodate pivotal or rotational movement. In one embodiment, the connection may be such as a ball stud or similar feature.

The embodiment depicted in the figures shows a biasing member 92 having the first end portion 94 rotationally connected to a lip portion 56 of an arm 48 and the second end portion 96 of the biasing member 92 being rotationally connected to a base flange 26. Additional biasing members 92 may be used, and used in different locations than as shown.

In some embodiments, a foot 98 may be located on the tool support 46. In more preferred embodiments, the foot 98 may be located on the arm base 52. In such a case, the foot 98 may be located on a lower surface 100 of the arm base 52, opposite the upper surface 66 of the lip portion 66. Further, the foot 98 may be positioned on the lower surface 100 of the arm base 52 such that it may be adapted to selectively contact the upper surface 18 of the base 16 when the tool support 46 is in the lowered position. In other embodiments, the foot 98 may be located further outward along the lower surface 100 such that it may selectively contact the substrate upon which the base 16 is located including a floor 100 of the vehicle 12, or a bumper of the vehicle 12.

The foot 98 may be constructed from many different materials that are resilient and capable of withstanding the difficult working environments including harsh temperatures and uses. In one embodiment, the foot 98 may be constructed of an elastic material such as a rubber compound, but other materials including but not limited to polymers, fiberglass, metals, and/or composite materials.

Regardless of the construction of the foot 98, the foot 98 may be adapted to absorb and/or cushion any impact from the first and second arms 48, 50 moving from the raised to the lowered position. In some cases, such as where a vice 104 may be located on the tool support 46, if the vice 104 is further loaded or retaining a heavy object, the weight associated with the tool support 46, the vice 104 and/or the object may be more than the biasing member 92 is rated to handle. Even if the biasing member 92 can handle the loaded tool support 46, the foot 98 may add cushioning and sound dampening to the device 10.

While a single foot 98 is mentioned, additional feet that may be located anywhere along the arm base 52, or in other locations along the arm base 52 may be used.

One or more tools, such as a vice 104, may be located on the tool support 46. The vice 104 may be supported on the tool support 46 such as on the lip portion 56, and more preferably on the upper surfaces 66 of the lip portions 56 at or near the front end portions 60 of the body portion 54. Fastener apertures (not shown) in the vice 104 are adapted to receive fasteners 106 extending through the vice 104 and into the apertures 70 in the lip portion 56 to secure the vice 104 to the tool support 46.

Figure 5:
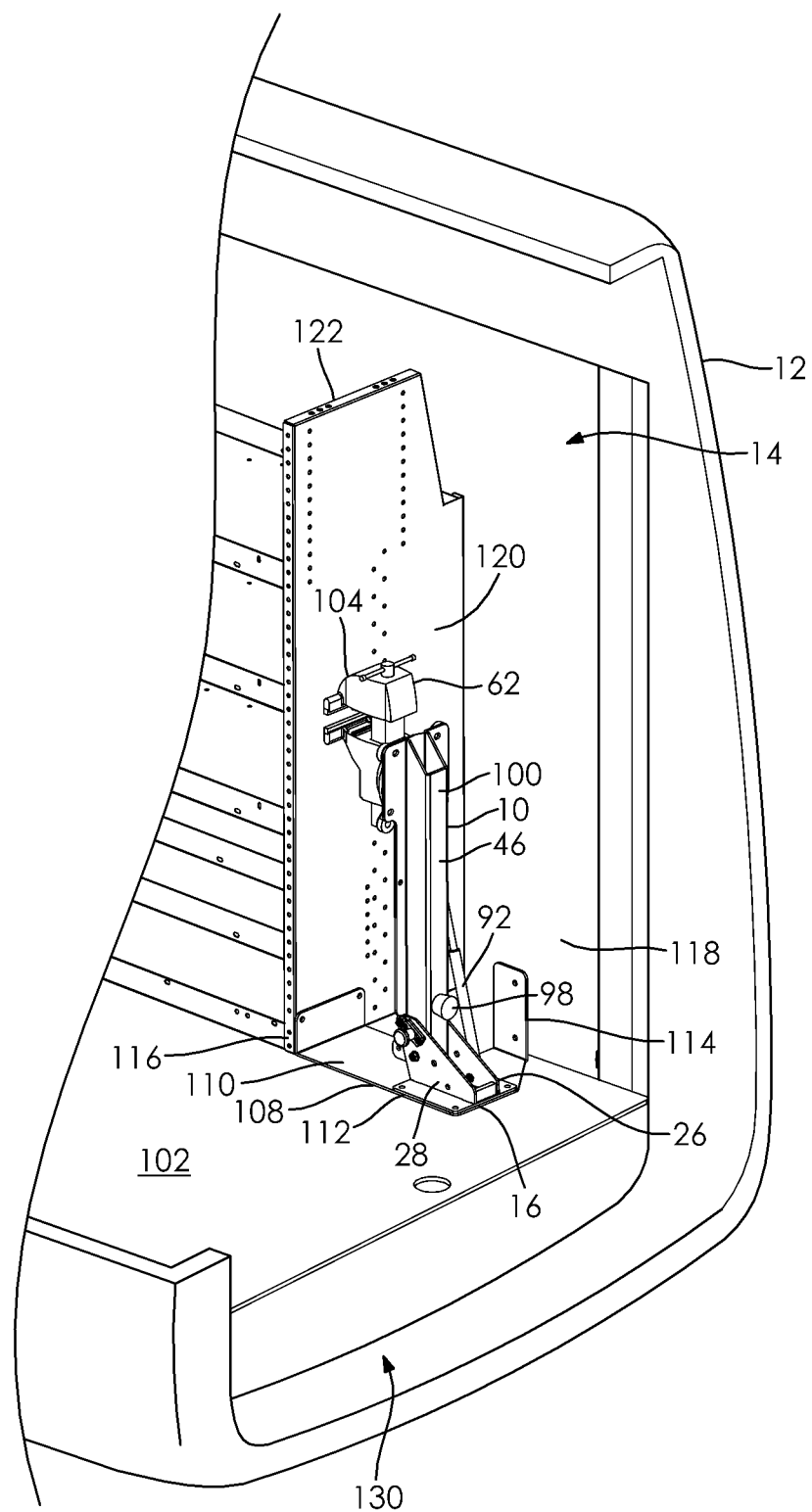
FIG. 5 is a perspective view of the mounting device in a raised position with a tool secured thereon.
Figure 6:
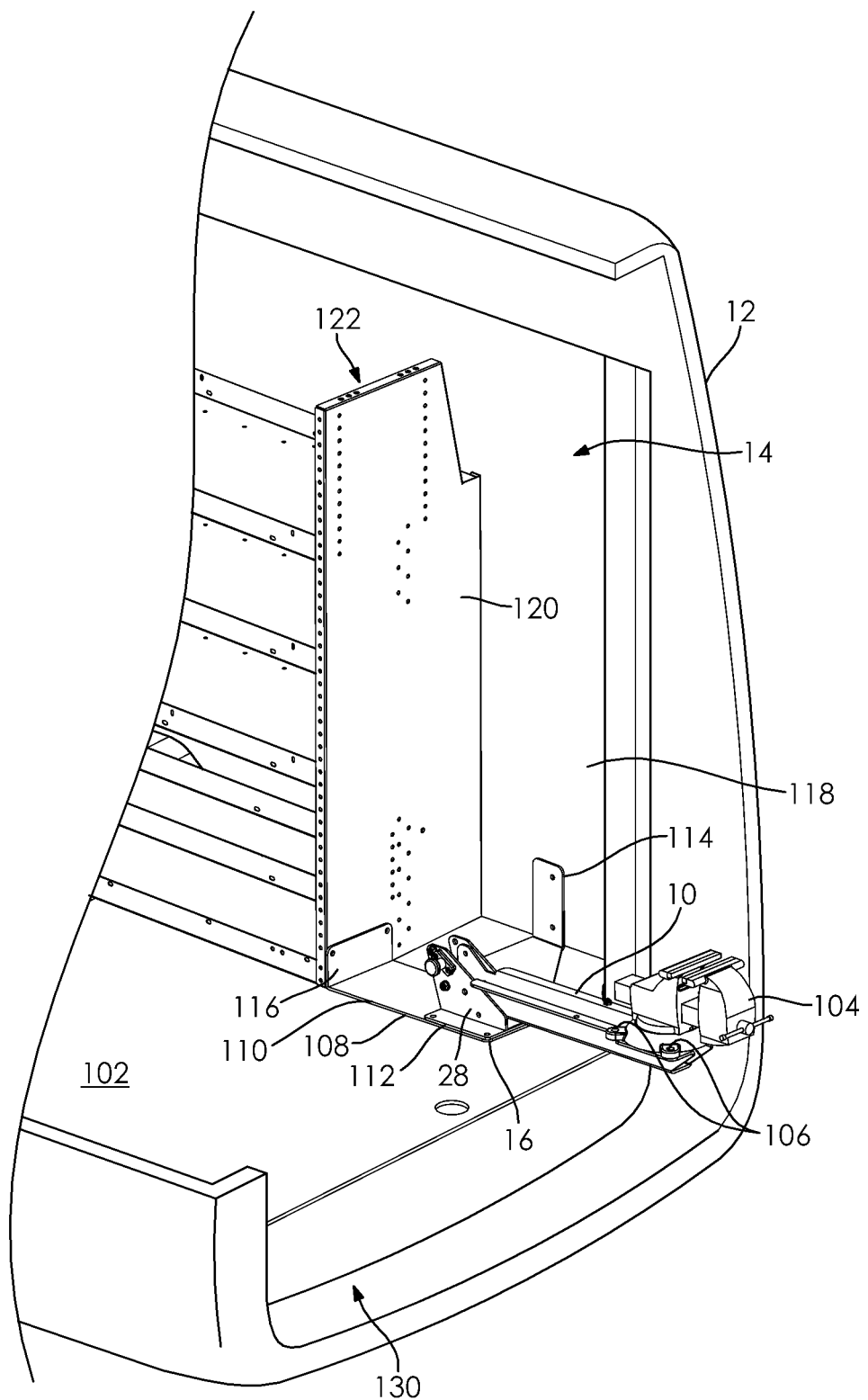
FIG. 6 is a perspective view of the mounting device in a lowered position with a tool secured thereon.

In some embodiments, such as depicted in FIGS. 5 and 6, a mounting plate 108 may selectively receive the tool mounting device 10. The mounting plate 108 may be connected at least partially to the base 16. For example, a lower surface 20 of the base 16 may sit directly on an upper surface 110 of the mounting plate 108.

The mounting plate 108 may have a tool mounting device mounting portion 112. In some embodiments, the mounting portion 112 may be plate-like in its shape. The mounting portion 112 may selectively receive the vice 104 directly thereon.

The mounting plate 108 may also have at least one support flange connected to the tool mounting device mounting portion 112. In some embodiments, there may be a first and a second support flange 114, 116. The support flanges 114, 116 may be one piece, integrally formed and unitary with the mounting plate 108. The support flanges 114, 116 may also extend at an angle with respect to the mounting plate 108, such as transverse the mounting plate 108.

In one embodiment depicted in FIGS. 5 and 6, the first support flange 114 may extend generally parallel the first and second base flanges 26, 28. The first support flange 114 may be connected to a secure mount, such as a wall 118 of the vehicle 12 or other like structure. The connection may be through mechanical fasteners or the like.

The second support flange 116 may extend generally transverse the first and second base flanges 26, 28. The second support flange 116 may be connected to a shelf support 120, such as through fasteners and the like. The shelf support 120 may be part of a shelf system 122 or other structures located in the cargo area 14.

FIGS. 5 and 6 depict the device 10 mounted in one exemplary vehicle 12 at one location in the vehicle 12. The device 10 may be placed in locations other than as shown.

Figure 7:
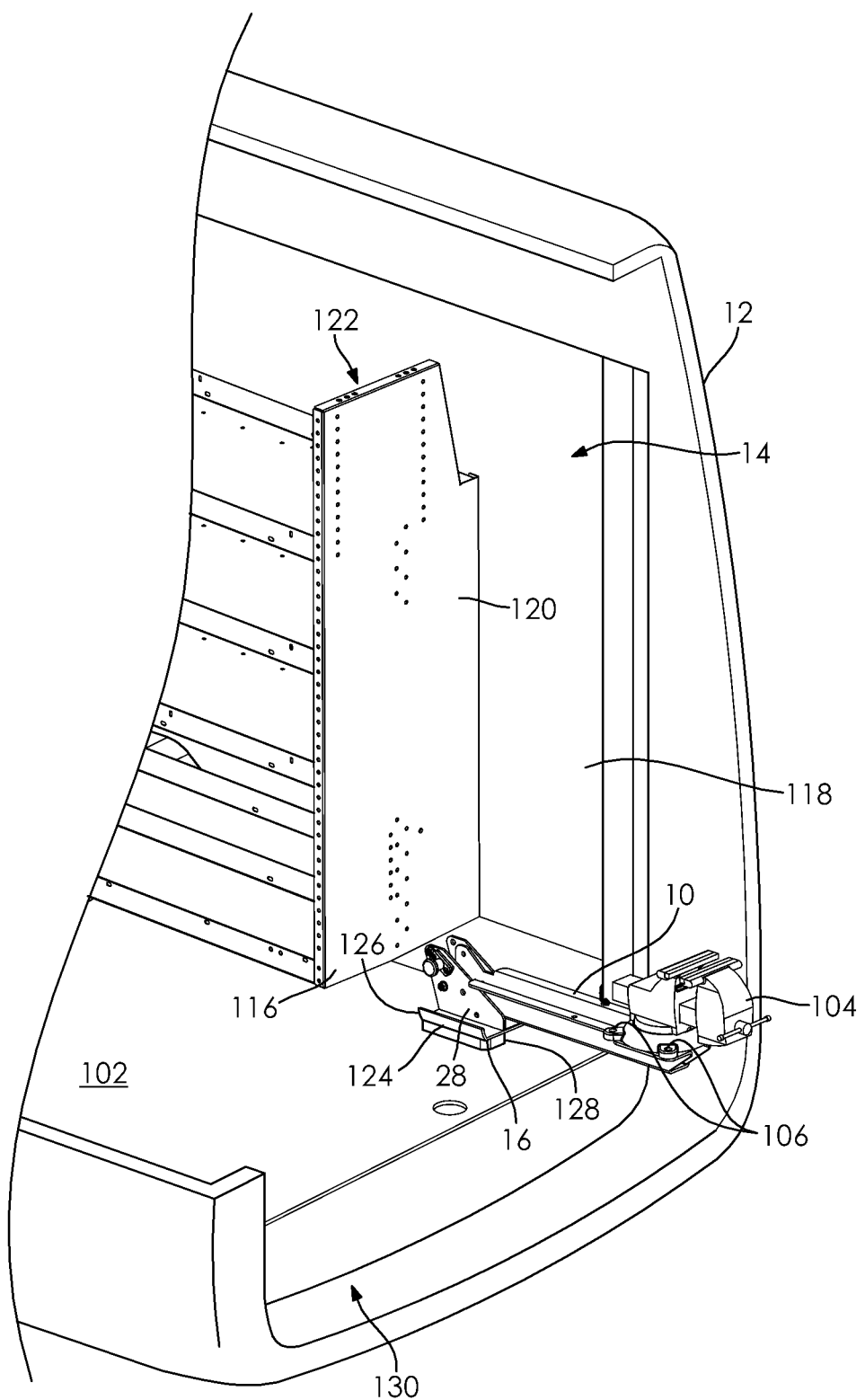
FIG. 7 is a perspective view of the mounting device in a lowered position with a tool secured thereon.

In another embodiment depicted in FIG. 7, the device 10 may be mounted on a different mounting plate 124. The mounting plate 124 may be substantially planar except for two upstanding side flanges. The mounting plate 124 may be adapted to sit on two rails 128. The rails 128 may be used to provide a secure location with floor ribs (not shown) in the vehicle floor 102. The rails 128 may be secured to the ribs, and then the plate 124 may be secured to the rails 128.

FIG. 5 depicts the device 10 in a lowered position. In the lowered position, at least one, if not both, of the lip portions 56, as well as the arm base 52, may be generally parallel the upper surface 18 of the base 16. Each body portion 54 of the tool support 46 may be located generally parallel the first and second base flanges 26, 28. The biasing member 92, connecting the tool support 46 with a base flange 26, 28, may be in a compressed condition.

The tool support pin 84 secures the tool support 46 in the lowered position. The tool support 46 provides the device 10 with sufficient length so that the tool 104 located thereon may extend beyond an opening 130 of the vehicle 12, and perhaps the vehicle bumper. In this manner, the device 10 provides a clear work area around the device 10 that is relatively free of objects or obstructions.

FIG. 6 depicts the device 10 in an upright position. In the upright position, at least one if not both, of the lip portions 56, as well as the arm base 52 may be generally transverse the upper surface 18 of the base 16. Each body portion 54 of the tool support 46 may be located generally parallel the first and second base flange 26, 28, but of course, it has been rotated approximately 90 degrees from the lowered position. An extension arm of the biasing member 92 is now extended from the housing 134 for the biasing member 92. When the tool support 46 is changed from the lowered to the raised position, the extension arm 132 moves into the housing 134 to reduce the overall length of the biasing member 92. The biasing member 92, which may be filled with fluid and/or springs, slows the movement of the extension arm 132 into the housing 134.

In this position, the tool support pin 84 has been moved to another set of apertures 44, 78 to secure the device 10 in the upright position. It can be appreciated that in the upright position, the device 10, and the tool 104, may be located within the vehicle 12 with the vehicle doors closed. In another embodiment, the device 10 can be located outside the vehicle 12, such as on a bumper or other exterior structure. In both cases, a compact, space saving design where the device is only deployed if needed is achieved.

In accordance with the provisions of the patent statutes, the present device has been described in what is considered to represent its preferred embodiments. However, it should be noted that the device can be practiced otherwise than as specifically illustrated and described without departing from its spirit or scope.

What is claimed is:

1. A tool mounting device, comprising:
a base having a first base flange and a second base flange extending therefrom;
a tool support selectively cantilevered with said first and second base flanges, said tool support adapted for selective pivotal motion with respect to said first and second base flanges,
wherein said tool support comprises a first arm and a second arm, said arms connected by an arm base, wherein said first and second arms each have lip portions adapted to support a tool thereon; and
a biasing member connected between one of said base flanges and said tool support,
wherein said biasing member has a first end connected by a ball joint to one of said lip portions and a second end connected by a ball joint to one of said base flanges.

2. The device of claim 1, wherein said base has a planar upper surface and a planar lower surface, wherein said first and second base flanges extend substantially parallel one another and substantially transversely from said upper surface.

3. The device of claim 1, wherein said first and second base flanges are separated from one another by a gap, and said first and second base flanges are substantially the same shape as one another.

4. The device of claim 3, wherein a portion of said tool support is located within said gap and is adapted for selective pivotal movement within said gap with respect to said first and second base flanges.

5. The device of claim 1, wherein said first and said second base flanges have aligned apertures and said tool support has at least one set of apertures aligned with said aligned apertures in said first and second base flanges.

6. The device of claim 1, wherein said first and second arms extend substantially parallel one another and said arm base extends between said first and second arms in a substantially transverse fashion.

7. The device of claim 1, wherein said arm base has a width that is approximately the same as a distance between the first and second arms.

8. The device of claim 1, wherein said lip portions are cantilevered away from said arm base.

9. The device of claim 1, wherein a tool support stop extends through aligned apertures in said first and second base flanges.

10. The device of claim 1, wherein a tool support pivot extends through aligned apertures in said first and second base flanges and aligned apertures in said first and second arms.

11. The device of claim 1, wherein a spring biased tool support pin selectively extends through aligned apertures between one of said base flanges and one of said arms of said tool support.

12. The device of claim 1, wherein said lip portions and said arm base are substantially parallel an upper surface of the base.

13. The device of claim 12, wherein a body portion of said tool support is substantially parallel said first and second base flanges.

14. The device of claim 1, wherein said lip portions and said arm base are generally transverse an upper surface of the base.

15. The device of claim 14, wherein a body portion of the tool support is substantially parallel the first and second base flanges.

16. A tool mounting device, comprising:
a base having a planar upper surface from which two parallel base flanges extend transversely therefrom;
a tool support selectively cantilevered with said first and second base flanges,
a tool support pivot extending through aligned apertures in both said tool support and first and second base flanges,
a tool support pin extending through aligned apertures in said tool support and one of said first or said second base flanges,
wherein said tool support has first and second arms each with lip portions,
wherein a biasing member is connected between one of said base flanges with a ball joint and one of said lip portions with a ball joint.

17. The tool mounting device of claim 16, wherein a portion of said tool support is located between said first and second base flanges.

18. The tool mounting device of claim 16, wherein said tool support pivot is coplanar with said tool support pin but said tool support pin is located closer to the lip portions of said tool support compared with said tool support pin.

19. The tool mounting device of claim 16, wherein lip portions on said tool support extend parallel but not coplanar with said base.

20. The tool mounting device of claim 1, wherein the biasing member is a hydraulic or pneumatic piston.

21. The tool mounting device of claim 1, wherein a primary extension direction of the biasing member is parallel a line of symmetry of the tool support.

22. The tool mounting device of claim 1, wherein the first end of the biasing member is connected to an underside surface of one of the lip portions and the second end of the biasing member is connected to a side wall of one of the base flanges.

23. The tool mounting device of claim 1, wherein the biasing member extends from the tool support to one of the base flanges at an acute angle.

24. A tool mounting device, comprising:
a base having a first base flange and a second base flange extending therefrom;
a tool support selectively cantilevered with said first and second base flanges,
wherein said tool support comprises a first arm and a second arm, said arms connected by an arm base,
wherein said first and second arms each have lip portions adapted to support a tool thereon, wherein each lip portion is one piece, unitary and integrally formed with their respective arm and each lip portion is cantilevered off of an upper edge of the respective arm; and
a biasing member connected between one of said base flanges and said tool support with ball joints.

* * * * *